(12) United States Patent
Schulz et al.

(10) Patent No.: US 10,133,063 B2
(45) Date of Patent: Nov. 20, 2018

(54) MICROSCOPE HAVING A CORRECTION UNIT FOR CORRECTING A VARIABLE SPHERICAL ABERRATION

(71) Applicant: Leica Microsystems CMS GmbH, Wetzlar (DE)

(72) Inventors: Christian Schulz, Solms (DE); Christian Schumann, Giessen (DE); Cornell Gonschior, Friedberg (DE); Tobias Bauer, Koenigstein/Ts. (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 15/327,659

(22) PCT Filed: Jul. 21, 2015

(86) PCT No.: PCT/EP2015/066649
§ 371 (c)(1),
(2) Date: Jan. 20, 2017

(87) PCT Pub. No.: WO2016/012450
PCT Pub. Date: Jan. 28, 2016

(65) Prior Publication Data
US 2017/0192227 A1     Jul. 6, 2017

(30) Foreign Application Priority Data
Jul. 21, 2014   (DE) ................. 10 2014 110 208

(51) Int. Cl.
*G02B 27/00*    (2006.01)
*G02B 13/18*    (2006.01)
(Continued)

(52) U.S. Cl.
CPC ....... *G02B 27/0068* (2013.01); *G02B 6/0005* (2013.01); *G02B 13/18* (2013.01);
(Continued)

(58) Field of Classification Search
CPC .. G02B 27/0068; G02B 6/0005; G02B 13/18; G02B 21/0032; G02B 21/06; G02B 27/0955; G02B 27/425
(Continued)

(56) References Cited

U.S. PATENT DOCUMENTS

| 5,978,155 A * | 11/1999 | Suenaga ............ G02B 27/0025 359/676 |
| 6,317,276 B1 * | 11/2001 | Braat .................. G02B 21/002 359/641 |
| 6,473,228 B1 * | 10/2002 | Toshimitsu .......... G02B 21/241 359/368 |
| 8,634,131 B2 * | 1/2014 | Redford ............. G02B 21/0024 359/379 |

(Continued)

FOREIGN PATENT DOCUMENTS

| DE | 102005034441 A1 | 2/2007 |
| EP | 0859259 A2 | 8/1998 |
| WO | WO 2012025349 A1 | 3/2012 |

*Primary Examiner* — Frank Font
(74) *Attorney, Agent, or Firm* — Leydig, Voit & Mayer, Ltd.

(57) ABSTRACT

A microscope includes at least one correction unit arranged in a beam path for correcting a variable spherical aberration. The correction unit has at least one optical correction element that is arranged in a convergent or divergent area of the beam path such that the optical correction element is movable along an optical axis. The at least one optical correction element has at least one correction surface. A part of the at least one correction surface through which the convergent or divergent area of the beam path passes forms a correction-effective surface section whose radial extension crosswise to the optical axis is adjustable by moving the correction element along the optical axis.

10 Claims, 5 Drawing Sheets

(51) Int. Cl.
*G02B 21/00* (2006.01)
*F21V 8/00* (2006.01)
*G02B 21/06* (2006.01)
*G02B 27/42* (2006.01)
*G02B 27/09* (2006.01)

(52) U.S. Cl.
CPC ......... *G02B 21/0032* (2013.01); *G02B 21/06* (2013.01); *G02B 27/0955* (2013.01); *G02B 27/425* (2013.01)

(58) Field of Classification Search
USPC .......................... 359/380, 656, 676, 712, 738
See application file for complete search history.

(56) References Cited

U.S. PATENT DOCUMENTS

| | | | |
|---|---|---|---|
| 8,659,827 B2* | 2/2014 | Redford | G02B 21/241 |
| | | | 359/434 |
| 9,383,573 B2* | 7/2016 | Matsumoto | G02B 21/0032 |
| 2005/0083517 A1* | 4/2005 | Asad | G02B 21/365 |
| | | | 356/124 |
| 2006/0291039 A1 | 12/2006 | Eda et al. | |
| 2007/0139763 A1 | 6/2007 | Wolleschensky et al. | |
| 2010/0246031 A1* | 9/2010 | Caldwell | G02B 13/00 |
| | | | 359/797 |
| 2011/0069381 A1* | 3/2011 | Redford | G02B 21/241 |
| | | | 359/379 |
| 2011/0141558 A1* | 6/2011 | Redford | G02B 21/0024 |
| | | | 359/385 |
| 2012/0257278 A1* | 10/2012 | Simonov | G02B 3/02 |
| | | | 359/557 |
| 2014/0362435 A1* | 12/2014 | Yokoi | G02B 21/16 |
| | | | 359/385 |

* cited by examiner

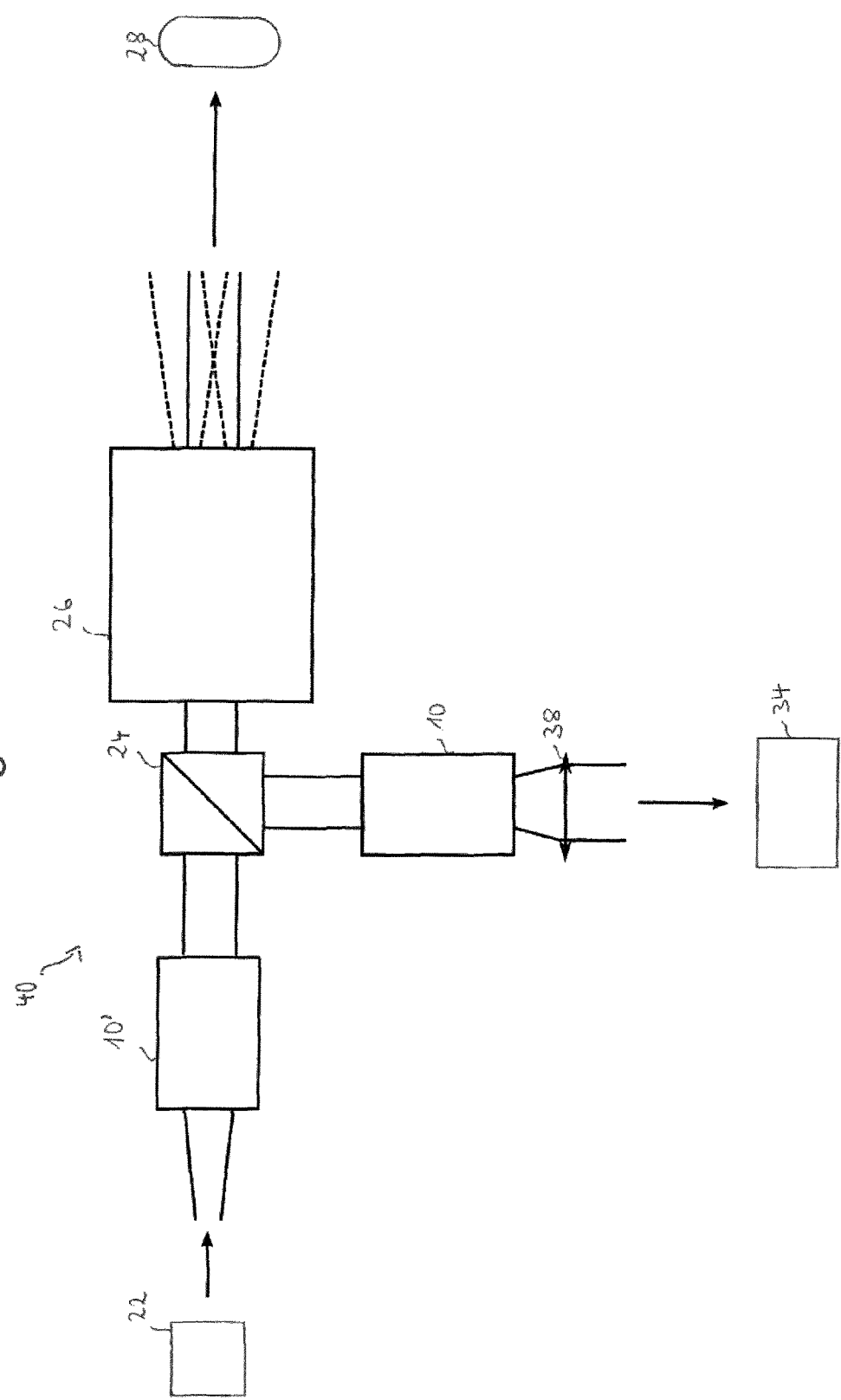

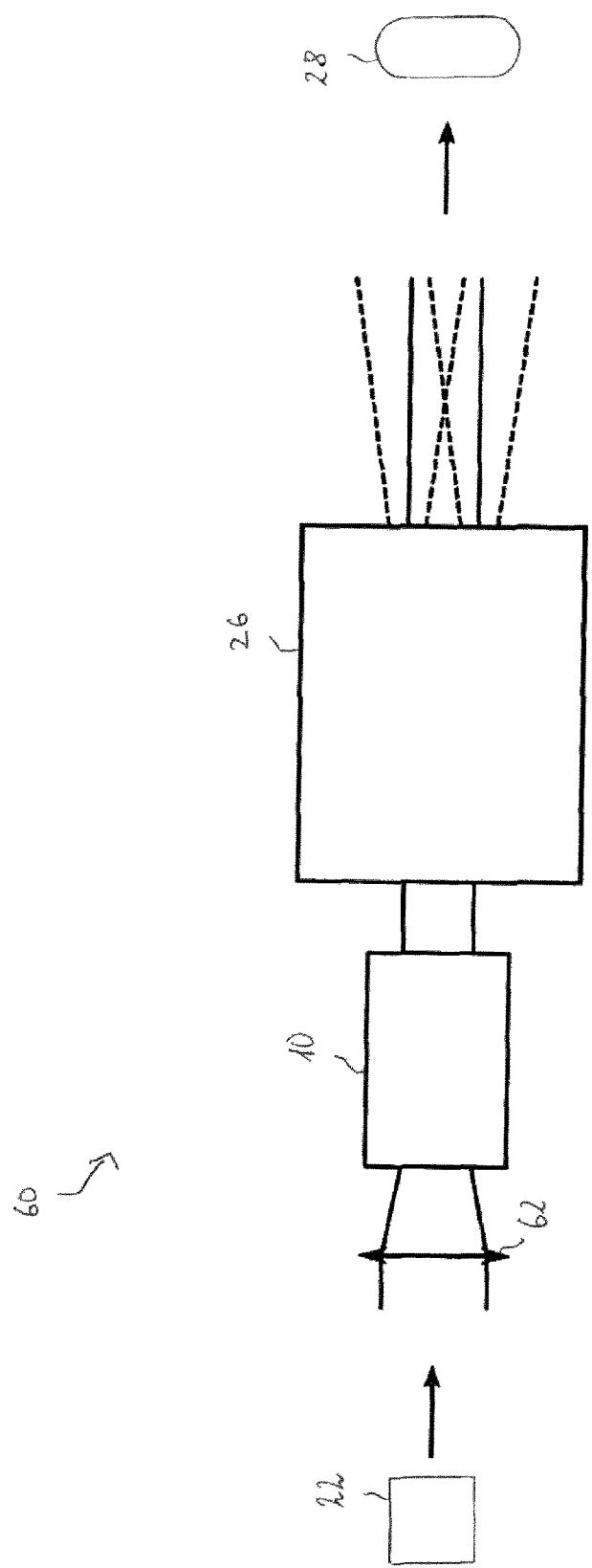

MICROSCOPE HAVING A CORRECTION UNIT FOR CORRECTING A VARIABLE SPHERICAL ABERRATION

CROSS-REFERENCE TO PRIOR APPLICATIONS

This application is a U.S. National Stage Application under 35 U.S.C. § 371 of International Application No. PCT/EP2015/066649 filed on Jul. 21, 2015, and claims benefit to German Patent Application No. DE 10 2014 110 208.8 filed on Jul. 21, 2014. The International Application was published in German on Jan. 28, 2016 as WO 2016/012450 A1 under PCT Article 21(2).

FIELD

The invention relates to a microscope having at least one correction unit arranged in a beam path for correcting a variable spherical aberration.

BACKGROUND

When a microscope is used to focus into a biological specimen, spherical aberrations caused by a refractive-index mismatch can occur that vary depending on the specimen depth. These aberrations lead to a reduction in the resolution and contrast. Moreover, together with the working distance of the objective as well as the absorption and scatter that occur in the specimen, they limit the maximum depth of penetration into the specimen.

For purposes correcting spherical aberrations, there are objectives with a correction ring that moves a lens group within the objective along the optical axis. The lens group that serves for the correction has to be taken into account during the optical design of the objective. As a rule, this can only be achieved with a great deal of mechanical effort. In particular, it is not possible to retrofit an objective with such a correction unit.

For purposes of correcting spherical aberrations, European patent application EP 0 859 259 A2 proposes arranging adapter pieces between the objective and the tube lens, said adapter pieces consisting of lenses that are cemented together and that can introduce or compensate for a variable spherical aberration. However, the proposed arrangement directly above the objective generally changes the parfocal length of the entire system. Moreover, the above-mentioned adapter pieces necessarily have to be configured for the specific objective because of the different pupil sizes of objectives having a different focal length.

U.S. Pat. No. 8,659,827 B2 discloses an adjustable afocal system that is arranged in the infinite beam path and that can introduce or compensate for spherical aberrations. Since this afocal system is arranged in an area of the beam path in which light is propagated simultaneously to various field points, the system has to be corrected for a complete field of view. This greatly restricts the correction effect that can be achieved.

International patent application WO 2012/025349 A1 shows a correction system that has freeform surfaces that can be moved laterally with respect to each other in order to compensate for spherical aberrations. The freeform surfaces needed for this correction system, however, have a complicated design and are thus expensive to produce.

SUMMARY

In an embodiment, the present invention provides a microscope including at least one correction unit arranged in a beam path for correcting a variable spherical aberration. The correction unit has at least one optical correction element that is arranged in a convergent or divergent area of the beam path such that the optical correction element is movable along an optical axis. The at least one optical correction element has at least one correction surface. A part of the at least one correction surface through which the convergent or divergent area of the beam path passes forms a correction-effective surface section whose radial extension crosswise to the optical axis is adjustable by moving the correction element along the optical axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 a schematic view of a confocal microscope in which one correction unit according to an embodiment of the invention is arranged between a light source and a main beam splitter and another correction unit is also arranged between a detector and the main beam splitter; and FIG. 5 a multiphoton microscope in which a correction unit according to an embodiment of the invention is arranged between a light source and a scanning module.

DETAILED DESCRIPTION

Figure 1:
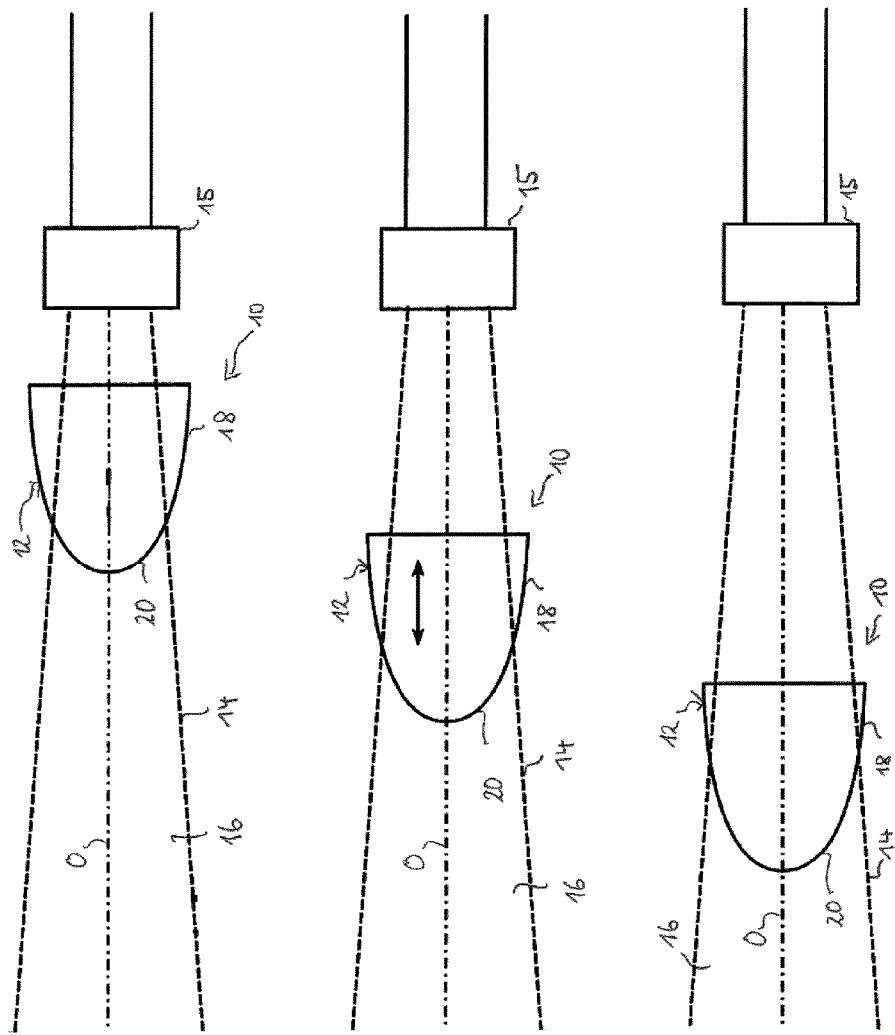
FIG. 1 a schematic view of a correction unit according to an embodiment of the invention, having an aspherical correction element that is arranged in various axial positions in a convergent area of a microscope beam path.

In an embodiment, the invention provides a microscope such that a variable spherical aberration, especially a spherical aberration caused by a refractive-index mismatch, can be corrected reliably and with simple technical means.

According to an embodiment of the invention, the correction unit provided in the microscope has at least one optical correction element that is arranged in a convergent or divergent area of the beam path so that it can be moved along the optical axis. The optical correction element has at least one correction surface, whereby its part through which the convergent or divergent area of the beam path passes, forms a correction-effective surface section whose radial extension crosswise to the optical axis can be changed by moving the correction element along the optical axis.

In an embodiment where the invention provides for the correction element to be moved axially in a convergent or divergent area of the beam path, then the optically effective surface section of the correction surface can be varied at will in the desired manner in order to influence the wave-front of the light bundle that is passing through the correction element. Thus, the distortion of the wave-front caused by the correction-effective surface section of the correction element can especially be set precisely in such a way as to compensate for the wave-front error caused by a refractive-index mismatch. For this purpose, the correction element can be configured as a single optical element or as a lens group or a cemented component.

The correction element can be axially moved either manually or by means of a motor. It is also possible to provide a control unit that sets the correction element by means of a control program.

Moreover, the correction unit according to an embodiment of the invention can also be configured in such a way that it contains several different correction elements that are designed to be changeable or switchable. These correction elements can, in turn, be changed or switched manually, by means of a motor or else by using a control program.

Preferably, the correction element is an aspherical refractive element, for example, an aspherical lens that is rotation-symmetrical around the optical axis and that is made of a light-refractive material, preferably an optical glass.

However, the correction element can also be made of a diffractive element such as, for example, a Fresnel zone plate or a hologram.

The correction element is preferably achromatized. However, it is likewise possible to use a non-achromatized element. Or course, this is especially the case if narrow-band light or even monochromatic laser light is being used.

The wave-front error induced by a refractive-index mismatch can be analytically expressed as follows:

$$\Psi(\rho) = dn_1 \left[ \sqrt{\frac{n_2^2}{n_1^2} - \rho^2 \sin^2\alpha} - \sqrt{1 - \rho^2 \sin^2\alpha} \right]$$

wherein $n_1$ and $n_2$ refer to the refractive indices of the adjacent media, whereas $\rho$ stands for the relative radial coordinate in the objective pupil, $\alpha$ stands for the angular aperture of the objective, and d stands for the penetration depth into the medium with the refractive index $n_2$.

This wave-front error can now be expanded, for example, into so-called Zernike polynomials as is described, for example, in P. Török, P. Varga, G. Nemeth, "Analytical solution of the diffraction integrals and interpretation of wave-front distortion when light is focused through a planar interface between materials of mismatched refractive indices", J. Opt. Soc. Am. A., Vol. 12, No. 12, 2660-2671 (1995). The lowest order of this expansion corresponds exactly to the defocusing that is induced by the refractive-index mismatch, which is also referred to in technical circles as the "fish tank effect". In contrast, the higher orders correspond to an aberration that cannot be refocused. This wave-front error that is to be compensated for can serve as the basis for the design of the surface form of the correction element.

Preferably, the surface form of the correction surface can be expressed on the basis of a polynomial expansion. The desired wave-front distortion of the light when it passes through the correction element and thus the desired surface form of the correction element can now be indicated by a parameterization on the basis of the above-mentioned rotation-symmetrical Zernike polynomials. However, it must be pointed out that the above-mentioned polynomial expansion does not have to be carried out specifically on the basis of Zernike polynomials, but rather, other polynomial expansions can also be used.

In another possible embodiment, the correction surface is formed by an elliptical paraboloid whose vertex is preferably located on the optical axis. In a section encompassing the optical axis, the correction surface then has the shape of a parabola.

In an especially preferred embodiment, the correction surface is configured in such a way that the change of the correction-effective surface section caused by moving the correction element along the optical axis corrects the spherical aberration brought about by a refractive-index mismatch. This means that, in this embodiment, when the correction element is moved axially, no defocusing is introduced in addition to the defocusing arising in the specimen due to the refractive-index mismatch.

In another advantageous embodiment, the correction unit is operationally coupled to a preferably automated focus drive that compensates for a defocusing caused by the axial movement of the correction element. Thus, the defocusing introduced by the axial movement of the correction element can be calculated, for example, mathematically by taking into account the surface form of the correction surface. The focus drive can then be actuated as a function of the mathematically determined defocusing so that an appropriate compensating refocusing is carried out.

Preferably, the microscope according to the invention has an adjustment lens that is behind the correction element in the beam path and that is configured in such a way that it collimates the light bundle passing through the correction element. This integration of a collimating adjustment lens into the correction unit makes it possible to readily use the correction unit in a collimated microscope beam path within the scope of a retrofit.

In an especially preferred embodiment, the above-mentioned adjustment lens is also configured in such a way that the cross section of the light bundle passing through the correction element can be adapted to the size of an objective pupil. As a result, the correction unit can be designed for a wide array of different objectives.

Preferably, the adjustment lens has a zoom system with which the cross section of the light bundle passing through the correction element can be continuously varied. The zoom setting can be adjusted manually, by means of a motor or else by using a control program.

Instead of a zoom system, it is also possible to use discretely switchable modules that permit a stepwise adaptation of the bundle cross section.

Preferably, the microscope according to the invention has an optical element to generate the convergent or divergent area of the beam path. This element can be implemented, for example, with a light-conducting fiber whose uncollimated fiber outlet influences the beam path in the desired manner. However, instead of a light-conducting fiber, it is likewise possible to use one or more suitable lenses that generate the convergent or divergent area of the beam path.

Preferably, the microscope according to the invention is a scanning microscope, especially a confocal microscope or a multiphoton microscope. In case of a confocal microscope, the correction unit is preferably arranged between a main beam splitter and a scanning system. Since only axial beams are to be observed at the cited place of the confocal microscope, the optical design of the correction element is greatly simplified. However, it is likewise possible for the correction unit to be arranged between a light source and the scanning module or else between a detector and the scanning module. It is also possible to provide two correction units according to the invention, one of which is arranged between the light source and the scanning module while the other is arranged between the detector and the scanning module. In a multiphoton microscope, the correction unit according to the invention is preferably arranged between the light source and the scanning module.

FIG. 1 shows a correction unit, designated in its entirety by the reference numeral 10, which is provided for use in a light microscope. The correction unit 10 serves to correct a spherical aberration in the light microscope that occurs due to a refractive-index mismatch and that varies depending on the specimen depth.

The correction unit 10 comprises an optical correction element 12 and an adjustment lens 15. The correction unit 12 is arranged in an area 14 of the microscope beam path in which the edge rays of a light bundle 16 striking the correction element 12 converge towards the optical axis O.

In the present embodiment, the correction element 12 is a lens element consisting of a light-refractive material, e.g. optical glass, whose side facing the incident light bundle 16 has an aspherical lens surface 18. The aspherical lens surface 18 has the shape of an elliptical rotation ellipsoid whose vertex lies on the optical axis O. In the section shown in FIG. 1 and encompassing the optical axis, the aspherical lens surface 18 then has the shape of a parabola.

The aspherical lens surface 18 forms a correction surface that is traversed by the convergent area 14 of the beam path only in its center surface section that runs through the optical axis O, whereas the edge sections of the correction surface 18 located away from the axis are arranged radially outside of the convergent area 14 of the beam path. The part of the correction surface 18 that is traversed by the convergent area 14 of the beam path will be referred to below as a correction-effective surface section 20.

The invention now provides for the correction element 12 to be moved along the optical axis O in order to vary the radial dimension of the central correction-effective surface section 20 perpendicular to the optical axis O as a function of the spherical aberration that is to be corrected. This variation of the correction-effective surface section 20 is illustrated in FIG. 1 for three different axial positions of the correction element 12. Thus, it can be seen from FIG. 1 that the aspherical surface section 20 that is rotation-symmetrical to the optical axis O is radially enlarged towards the outside because of the convergence of the beam path area 14 when the correction element is moved counter to the light direction (in FIG. 1, from right to left) along the optical axis O. Since the correction effect that is achieved by the correction element 12 changes with the variation of the correction-effective surface section 20, an aberration that varies with the specimen depth can be corrected by suitably positioning the correction element 12 along the optical axis O.

The adjustment lens 15 contained in the correction unit 10 has the function of collimating the light bundle 16 that has passed through the correction element 12, so that the beam path has a parallel orientation after having exited from the adjustment lens 15. The adjustment lens 15 also serves to adapt the cross section of the light bundle 16 to the size of a pupil of the microscope objective.

Figure 2:
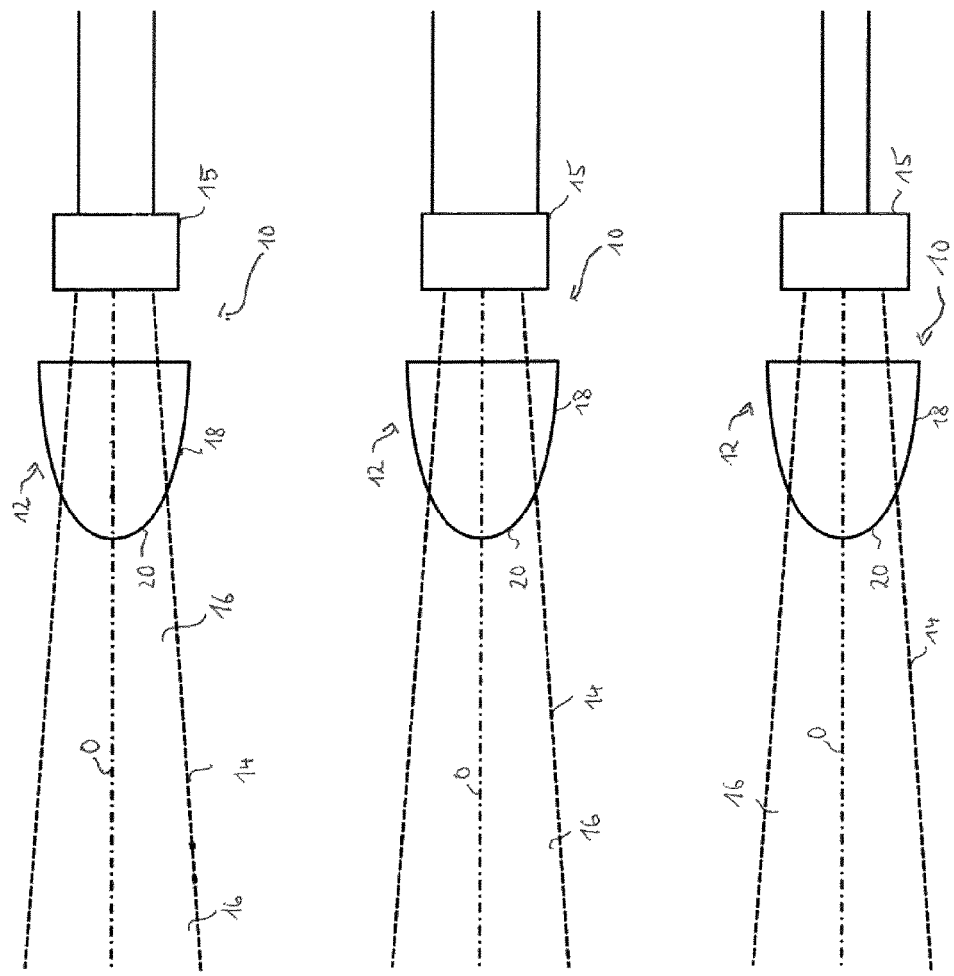
FIG. 2 a schematic view illustrating the way in which an adjustment lens influences the cross section of a light bundle passing through the aspherical correction element.

In the present embodiment, the adjustment lens 15 is a zoom system with which the bundle cross section of the collimated light bundle 18 can be continuously varied. FIG. 2 illustrates three different zoom settings for the adjustment lens 15 and the corresponding cross sections of the light bundle 16 exiting from the adjustment lens 15.

Figure 3:
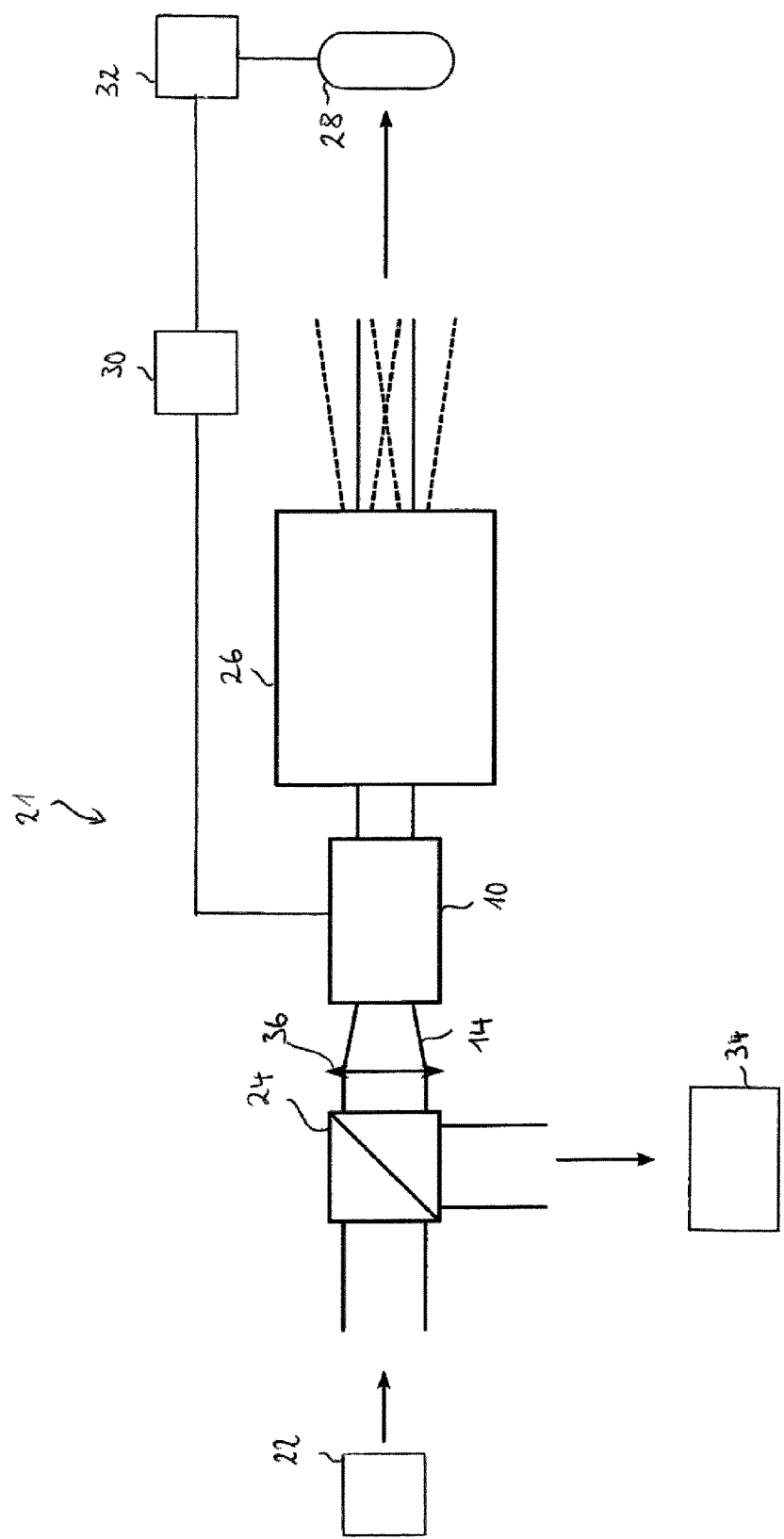
FIG. 3 a schematic view of a confocal microscope in which the correction unit according to an embodiment of the invention is arranged between a main beam splitter and a scanning module.

FIGS. 3 to 5 show various application possibilities for the correction unit 10 merely by way of examples.

FIG. 3 purely schematically shows a confocal microscope 21 comprising a light source 22, a main beam splitter 24, a scanning module 26, an objective 28, a control unit 30, a focus drive 32 as well as a detector 34. Furthermore, in the confocal microscope 21, there is the correction unit 10 which was described above in conjunction with FIGS. 1 and 2 and which has a collector lens 36 in front of it. The collector lens generates the convergent area 14 of the beam path in which the correction element 12 of the correction unit 10 is moved axially. In the embodiment shown in FIG. 3, the correction unit 10 is arranged between the main beam splitter 24 and the scanning module 26.

The control unit 30 has, among other things, the function of moving the correction element 12 axially in the convergent area 14 of the beam path as a function of the spherical aberration that is to be corrected, for example, using a suitable motor. The correction unit 10 is also connected to the focus drive 32 via the control unit 30. Owing to this coupling of the correction unit 10 to the focus drive 32, a defocusing caused by the axial movement of the correction element 12 can be compensated for in that the focus drive 32 under the control of the control unit 30 is actuated to carry out an appropriate refocusing. This is done, for instance, on the basis of a control signal which is emitted by the control unit 30 so that the defocusing caused by the correction element 12 is incorporated into said control signal. Consequently, the defocusing can be calculated, for example, mathematically from the surface form of the aspherical correction surface 18 as well as from the axial movement of the correction member 12.

FIG. 4 shows another embodiment, namely, a confocal microscope 40, that has two correction units 10 and 10' according to the invention. For the rest, the microscope components that are shown in FIG. 4 and that correspond to those shown in FIG. 3 are designated by the same reference numerals.

In the confocal microscope 40 according to FIG. 4, the first correction unit 10' is arranged in the beam path 12 between the light source 22 and the main beam splitter 24. Since the light bundle emitted by the light source 22 in this example enters the first correction unit 10' divergently, the latter has been modified in terms of its adjustment lens as compared to the correction unit shown in FIG. 1, which receives a convergent light bundle. Therefore, the adjustment lens of the correction unit 10' is configured to transform a divergent light bundle into a collimated bundle rather than a convergent one.

The second correction unit 10, which is arranged in the beam path between the main beam splitter 24 and the detector 34, in turn, corresponds to the unit shown in FIG. 1. The second correction unit 10 is behind a collector lens 38 that collimates the divergent light bundle exiting from the correction unit 10.

FIG. 5, in turn, purely schematically shows a multiphoton microscope 60, in which the correction unit 10 according to FIG. 1 is arranged between the light source 22 and the scanning module 26. The correction unit 10 is in front of a collector lens 62 that transforms the collimated light bundle emitted by the light source 22 into a convergent bundle that its then acted upon by the correction unit 10 in the described manner in order to correct the spherical aberration.

It should be pointed out that the applications shown in FIGS. 3 to 5 are to be understood merely by way of examples and they can be modified and augmented in a meaningful manner without departing from the correction concept according to the invention. For example, further above, the coupling of the correction unit 10 to the focus drive 32 was only explained for the embodiment according to FIG. 3. It goes without saying that the examples shown in FIGS. 4 and 5 can also be augmented by such a coupling.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A microscope comprising:
   at least one correction unit arranged in a beam path for correcting a variable spherical aberration, the correction unit having at least one optical correction element that is arranged in a convergent or divergent area of the beam path such that the at least one optical correction element is movable along an optical axis, the at least one optical correction element having at least one correction surface, a part of the at least one correction surface through which the convergent or divergent area of the beam path passes forming a correction-effective surface section whose radial extension crosswise to the optical axis is adjustable by moving the correction element along the optical axis,
   wherein the microscope is a scanning microscope in which the at least one correction unit is arranged between a main beam splitter and a scanning module, and in which the at least one correction unit is arranged between a light source and the scanning module and/or between a detector and the scanning module, and
   wherein the at least one correction surface is formed by an elliptical paraboloid and is configured in such a way that a change of the correction-effective surface section caused by moving the at least one optical correction element along the optical axis corrects the spherical aberration brought about by a refractive-index mismatch.

2. The microscope according to claim 1, wherein the at least one correction element includes an aspherical refractive element or a diffractive element.

3. The microscope according to claim 1, wherein the at least one correction element includes an aspherical refractive element, and wherein a surface form of the aspherical refractive element is expressible on the basis of a polynomial expansion.

4. The microscope according to claim 1, wherein the at least one correction surface is configured rotation-symmetrically around the optical axis.

5. The microscope according to claim 1, further comprising a focus drive that is operationally coupled to the at least one correction unit and is configured to compensate for a defocusing caused by movement of the at least one correction element.

6. The microscope according to claim 1, wherein the at least one correction unit has an adjustment lens that is disposed behind the at least one correction element in the beam path and that is configured in such a way that the adjustment lens collimates a light bundle passing through the at least one correction element.

7. The microscope according to claim 6, wherein the adjustment lens is configured in such a way that a cross section of the light bundle passing through the at least one correction element is adaptable to a size of an objective pupil.

8. The microscope according to claim 6, wherein the adjustment lens has a zoom system.

9. The microscope according to claim 1, further comprising an optical element configured to generate the convergent or divergent area of the beam path.

10. The microscope according to claim 9, wherein the optical element is a light-conducting fiber.

* * * * *